United States Patent
Oriakhi et al.

(10) Patent No.: US 10,190,008 B2
(45) Date of Patent: Jan. 29, 2019

(54) METHOD FOR PRINTING ON WATER-SOLUBLE MATERIAL

(71) Applicant: Fujifilm Imaging Colorants, Inc., New Castle, DE (US)

(72) Inventors: Christopher Oriakhi, New Castle, DE (US); Philip John Double, New Castle, DE (US); Ravi Shankar, New Castle, DE (US); Emmanuel Dimotakis, New Castle, DE (US)

(73) Assignee: Fujifilm Imaging Colorants, Inc., New Castle, DE (US)

( * ) Notice: Subject to any disclaimer, the term of this patent is extended or adjusted under 35 U.S.C. 154(b) by 0 days.

(21) Appl. No.: 15/744,886

(22) PCT Filed: Jul. 1, 2016

(86) PCT No.: PCT/GB2016/051992
§ 371 (c)(1),
(2) Date: Jan. 15, 2018

(87) PCT Pub. No.: WO2017/009601
PCT Pub. Date: Jan. 19, 2017

(65) Prior Publication Data
US 2018/0223119 A1    Aug. 9, 2018

Related U.S. Application Data

(60) Provisional application No. 62/192,641, filed on Jul. 15, 2015.

(51) Int. Cl.
*C09D 11/326* (2014.01)
*C09D 11/40* (2014.01)
(Continued)

(52) U.S. Cl.
CPC ............ *C09D 11/326* (2013.01); *B41M 1/04* (2013.01); *B41M 5/0047* (2013.01);
(Continued)

(58) Field of Classification Search
None
See application file for complete search history.

(56) References Cited

U.S. PATENT DOCUMENTS

| 7,714,076 B2 | 5/2010 | Krepski et al. |
| 8,087,357 B2 | 1/2012 | Denome et al. |

(Continued)

FOREIGN PATENT DOCUMENTS

| WO | 2006/064193 A1 | 6/2006 |
| WO | 2009/120420 A1 | 10/2009 |

(Continued)

OTHER PUBLICATIONS

IP.com search.*

*Primary Examiner* — Lisa M Solomon
(74) *Attorney, Agent, or Firm* — Banner & Witcoff, Ltd.

(57) ABSTRACT

A method for printing on a water-soluble material which comprises the following steps:
a) ink jet printing an ink onto a water-soluble material so as to form an image wherein the ink comprises a self-dispersible pigment which comprises a carboxy-functional dispersant crosslinked around a pigment core by a cross-linking agent having at least two groups selected from oxetane, carbodiimide, hydrazide, oxazoline, aziridine, isocyanate, N-methylol, keteneimine, isocyanurate and epoxy groups;
b) overprinting the image formed in step A) with a water soluble overprint varnish, also printed material and inks. Also inks, ink-sets and printed water-soluble material.

13 Claims, 1 Drawing Sheet

(51) Int. Cl.
  *C09D 11/322* (2014.01)
  *C09D 11/38* (2014.01)
  *C09D 11/54* (2014.01)
  *B41M 5/00* (2006.01)
  *B41M 7/00* (2006.01)
  *B41M 1/04* (2006.01)

(52) U.S. Cl.
  CPC .......... *B41M 5/0064* (2013.01); *B41M 7/009* (2013.01); *B41M 7/0054* (2013.01); *C09D 11/322* (2013.01); *C09D 11/38* (2013.01); *C09D 11/40* (2013.01); *C09D 11/54* (2013.01); *B41P 2200/12* (2013.01)

(56) References Cited

U.S. PATENT DOCUMENTS

| | | | |
|---|---|---|---|
| 8,309,203 B2 | 11/2012 | Catalfamo | |
| 8,757,062 B2 | 6/2014 | Content et al. | |
| 8,764,177 B2 | 7/2014 | Annable et al. | |
| 9,040,620 B2 | 5/2015 | Annable et al. | |
| 9,127,178 B2 | 9/2015 | Cordwell et al. | |
| 9,267,044 B2 | 2/2016 | Annable et al. | |
| 9,309,425 B2 | 4/2016 | Popat et al. | |
| 9,969,895 B2 * | 5/2018 | Double | C09D 11/322 |
| 2008/0002004 A1 | 1/2008 | O'Donnell et al. | |
| 2015/0132545 A1 | 5/2015 | O'Donnell et al. | |
| 2016/0032118 A1 | 2/2016 | Morris et al. | |
| 2016/0032119 A1 | 2/2016 | Morris et al. | |
| 2017/0158896 A1 | 6/2017 | Double et al. | |

FOREIGN PATENT DOCUMENTS

| | | |
|---|---|---|
| WO | 2010/038071 A1 | 4/2010 |
| WO | 2014/147374 A1 | 9/2014 |
| WO | 2016/005727 A1 | 1/2016 |
| WO | 2016/092309 A1 | 6/2016 |
| WO | 2016/092310 A1 | 6/2016 |
| WO | 2016/092312 A1 | 6/2016 |

* cited by examiner

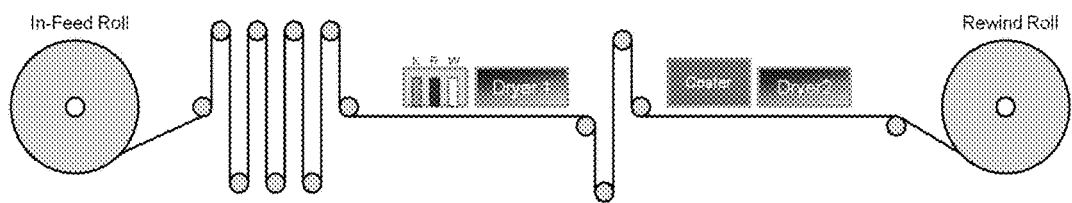

METHOD FOR PRINTING ON WATER-SOLUBLE MATERIAL

RELATED APPLICATIONS

This application is a National Stage Application under 35 U.S.C. 371 of PCT application PCT/GB2016/051992 designating the United States and filed Jul. 1, 2016; which claims the benefit of U.S. provisional application No. 62/192,641 and filed Jul. 15, 2015 each of which are hereby incorporated by reference in their entireties.

FIELD

This invention relates to a method for printing on a water soluble material, the printed material and an ink.

BACKGROUND

Agrochemicals, water-treatment chemicals, detergents and the like are commonly supplied in unit-dose pouches where the active chemical is contained within a water-soluble (usually polyvinyl alcohol) film. Increasingly regulatory authorities are requiring that each of these unit-dose soluble packages are individually labelled. Thus, for example, it is proposed that in the EU that any detergent unit-dose package containing more than 25 ml of an irritant or corrosive chemical will need to be individually labelled as such.

Printing on the individual pouches may be done either on the web of film before the pouch has been made, when the image can be printed on either side of the film so that it ends up inside or outside the finished pouch, or after the pouch has been made when the image is on the outside of the pouch.

Detergent pouches can be produced either on rotary drum machines such as those produced by Cloud Packaging Equipment, Eme Engel Machinefabriek en Engineering B.V. or Green Sustainable Packaging Inc. Pouches can also be produced on a flat bed machine such as those produced by Harro Höfliger Verpackungsmaschinen GmbH. On rotary drum machines ink-jet printers can be installed on either one of the webs feeding the machine or placed to print on the formed pouches.

The colorants for use in printing on these water-soluble materials must meet many demanding criteria. Thus, they must display excellent adhesion to water-soluble materials (such as polyvinyl alcohol), they must give clear images with good scuff and scratch resistance and crucially they must be able to readily disperse/dissolve in water without leaving any residue or ink skin. It has been found that pigments give excellent performance.

Since the colorant must dissipate when the water-soluble pouch dissolves the pigments (which are in their native state insoluble) must be in a form able to readily disperse.

There are a number of different treatments which enable pigments to be self-dispersible. However, this technology is usually aimed at providing a pigment which can form a stable dispersion in a defined liquid medium. Dispersing a self-dispersible pigment in a defined liquid medium, such as an ink or paint, typically requires careful processing and the selection of solvents and other additives able to help disperse and stabilise the pigment.

This is a very different challenge to providing a pigment able to completely and rapidly self-disperse at room temperature in an aqueous environment and existing commercially available self-dispersible pigments are not able to satisfactorily disperse without leaving an undesirable residue.

SUMMARY

The applicants have identified a particular form of a self-dispersible pigment which when printed onto a water-soluble material is able to disperse when the film dissolves without leaving any unwanted residue.

The applicants have also found that if a particular overprint varnish is applied after printing then it dramatically improves the robustness of the printed image without having a detrimental effect on the dissipation of the pigment.

BRIEF DESCRIPTION OF THE DRAWINGS

The foregoing and other features and advantages of the present embodiments will be more fully understood from the following detailed description of illustrative embodiments taken in conjunction with the accompanying drawings in which:

FIG. 1 shows a schematic of a printer dryer integration with web according to one embodiment of the disclosure.

DETAILED DESCRIPTION

All parts and percentages herein (unless stated otherwise) are by weight

Thus, the present invention is concerned with a method for printing on a water-soluble material which comprises the following steps:

A) ink jet printing an ink onto a water-soluble material so as to form an image wherein the ink comprises a self-dispersible pigment which comprises a carboxy-functional dispersant crosslinked around a pigment core by a cross-linking agent having at least two groups selected from oxetane, carbodiimide, hydrazide, oxazoline, aziridine, isocyanate, N-methylol, keteneimine, isocyanurate and epoxy groups;

B) overprinting the image formed in step A) with a water soluble overprint varnish.

The printed image may be regulatory information, safety or use instructions, advertising copy or an image for commercial use such as a bar code.

Preferably the water-soluble material comprises a polymeric material.

Suitable polymers and copolymers include polyvinyl alcohols; polyvinyl pyrrolidone; polyalkylene oxides; acrylamide; acrylic acid; cellulose; cellulose ethers; cellulose esters; cellulose amides; polyvinyl acetates; polycarboxylic acids and salts; polyaminoacids or peptides; polyamides; polyacrylamide; copolymers of maleic/acrylic acids; polysaccharides, including starch; gelatine; natural gums, such as xanthum and carragum; polyacrylates and water-soluble acrylate copolymers; methylcellulose; carboxymethylcellulose sodium; dextrin, ethylcellulose; hydroxyethyl cellulose; hydroxypropyl methylcellulose; maltodextrin and polymethacrylates.

More preferably the water-soluble material comprises a polymeric material selected from polyvinyl alcohols, polyvinyl alcohol copolymers and hydroxypropyl methyl cellulose (HPMC), and combinations thereof. Preferably, the level of polymer in the water-soluble material is at least 60%.

The polymer component of the water-soluble material preferably has an average molecular weight of from 1,000 to 1,000,000, more preferably of from 10,000 to 300,000 and especially of from 20,000 to 150,000.

Mixtures of polymers can be used in the water-soluble material. This can be beneficial to control the mechanical and/or dissolution properties of the water-soluble material. Thus, it is possible to mix a polymer with a high water-solubility with a polymer with a high mechanical strength.

Also suitable are polymer blend compositions, for example comprising hydrolytically degradable and water-soluble polymer blends such as polylactide and polyvinyl alcohol, obtained by mixing polylactide and polyvinyl alcohol, typically comprising about 1-35% by weight polylactide and about 65% to 99% by weight polyvinyl alcohol.

In a preferred embodiment the polymers are of from 60% to 98% hydrolysed and more preferably of from 80% to 90% hydrolysed, so as to improve the dissolution characteristics of the material.

The water-soluble material can also comprise one or more additives. For example, it can be beneficial to add plasticisers, for example glycerol, ethylene glycol, diethyleneglycol, propylene glycol, sorbitol and mixtures thereof.

Preferably the water-soluble material is a polyvinyl alcohol (PVA) film.

Examples of preferred PVA films include Monosol M8630, as sold by MonoSol, PT film and K-series films supplied by Aicello and VF-HP film supplied by Kuraray.

In the method for printing of the present invention the water-soluble material is intended for use as a unit-dose pouch containing an agrochemical, water-treatment chemical or a detergent especially a detergent. The water-soluble material may be printed on prior to forming the pouch, before the pouch is filled or after filling the pouch with a unit dose.

A water-soluble material is any material which is able to dissolve within 90 seconds at 20° C. under the following conditions.

Three test samples, 3.8 cm by 3.2 cm, are cut from a film. Each test specimen is then secured in a 35 mm slide mount.

A breaker is filled with 500 ml of water at 20° C. and the level of water in the beaker marked. The beaker is then set on a magnetic stirrer a stir bar added and the speed adjusted until a vortex develops which is approximately one-fifth the height of the water column. The depth of the vortex is marked.

The 35 mm slide mount, holding the sample, is secured to a holder above the beaker by means of an alligator clamp such that the long end of the slide mount is parallel to the water surface. The depth adjuster of the holder should be set so that when the slide is dropped, the end of the clamp will be 0.6 cm below the surface of the water. One of the short sides of the slide mount should be next to the side of the beaker with the other positioned directly over the centre of the stirring rod such that the film surface is perpendicular to the flow of the water.

In one motion the secured slide and clamp is dropped into the water and the timer started. Disintegration occurs when the film breaks apart. When all visible film is released from the slide mount, the slide is raised out of the water while continuing to monitor the solution for un-dissolved film fragments. Dissolution occurs when all film fragments are no longer visible and the solution becomes clear.

The individual and average disintegration and dissolution time are recorded.

A detailed discussion of the test method can be found in U.S. Pat. No. 6,787,512.

Ink-jet printing is a non-impact printing technique in which droplets of an ink are ejected through fine nozzles onto a substrate without bringing the nozzles into contact with the substrate. There are basically three types of ink-jet printing:

i) Continuous ink-jet printing uses a pressurized ink source that produces a continuous stream of ink droplets from a nozzle. The droplets of ink are directed either thermally or by electrostatic means at a nominally constant distance from the nozzle. Those droplets which are not successfully deflected are recycled to the ink reservoir via a gutter.

ii) Drop-on-demand ink-jet printing where the ink is stored in a cartridge and fired from the print-head nozzle using a pressurization actuator (usually thermal or piezoelectric). With drop-on-demand printing only the drops that are required for printing are produced.

iii) Single pass industrial ink-jet printing. In industrial applications ink-jet printers are required to work at high speeds. Optimally a print-head for an industrial ink-jet printer will have multiple nozzles arranged at a high density to enable high productivity single-pass printing with acceptable print resolutions. The ink for these printers may come directly from a storage tank or it may be supplied by a. Re-circulating ink-jet print head. In a re-circulating print head the ink is continuously re-circulated in the print-head and (as in drop-on demand printing) only drops required for printing are drawn off to the nozzle.

Single-pass print-heads with an ink re-circulation system, such as those manufactured by FUJIFILM Dimatix, are better suited to pigment inks than single-pass print-heads without a ink recirculation system, for example the Kyocera KJ4B print-head. However, the method of printing according to the present invention is able to effectively use both of these types of single-pass print-head without having an adverse effect on their jetting performance.

Preferably the method for printing according to the present invention uses a single-pass print-heads with an ink re-circulation system The method of printing of the present invention may use any ink-jet printer with a suitable print head (preferably with an ink re-circulating print-head). Preferably the print-head has an ink re-circulation channel in the ink supply system. This channel allows for fresh ink to be available for jetting and can be part of the ink supply system or even specially engineered channels which run behind the nozzle plate. It is preferred that the ink supply system runs behind the nozzle plate as this allows for the use of more volatile inks whilst not compromising restarUlatency behaviour. Behind nozzle plate re-circulation is exemplified in commercially available FUJIFILM Dimatix print-heads such as Samba® or SG1024®.

The self-dispersible pigment is preferably derived from any of the classes of pigments described in the Third Edition of the Colour Index (1971) and subsequent revisions of, and supplements thereto, under the chapter headed "Pigments".

Examples of suitable organic pigments are those from the azo (including disazo and condensed azo), thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes. Carbon black, although often regarded as being inorganic, behaves more like an organic pigment in its dispersing properties and is also suitable. Preferred organic pigments are phthalocyanines, especially copper phthalocyanine pigments, azo pigments, indanthrones, anthanthrones, quinacridones and carbon black pigments.

The pigment is preferably a yellow, cyan, orange, magenta, red, green, blue or black pigment. The pigment may be a single chemical species or a mixture comprising two or more chemical species (e.g. a mixture comprising two or more different pigments). In other words, two or more different pigments solids may be used in the process of the present invention. Preferably the pigment is a yellow, cyan, magenta, red, or black pigment More preferably the self-dispersible pigment comprises one or more of Carbon Black; Pigment Blue 15:3; Pigment Yellow 74, Pigment Yellow 155 and Pigment Red 122.

The dispersant, prior to cross-linking with the cross-linking agent, preferably has an acid value of at least 125 mg KOH/g.

The dispersant preferably has one or more oligomeric dispersing groups.

In order to provide water-dispersibility, the polymer-encapsulated pigment particles preferably have carboxy groups (i.e. not all of the carboxy groups in the dispersant are crosslinked to form the polymer-encapsulated pigment particles).

The polymer-encapsulated pigment particles may be prepared by cross-linking some of the carboxy groups in a carboxy-functional dispersant in the presence of a pigment and a cross-linking agent, preferably at a temperature of less than 100° C. and/or a pH of at least 6. Such cross-linking is usually performed in an aqueous medium, for example in a mixture comprising water and organic solvent. Suitable mixtures comprising water and organic solvent are as described above in relation to the ink.

Preferably, the polymer-encapsulated pigment particles have a Z-average particle size of less than 500 nm, more preferably from 10 to 400 nm and especially from 15 to 300 nm.

The Z-average particle size may be measured by any means, but a preferred method is by photo correlation spectroscopy devices available from Malvern® or Coulter®.

Preferably the carboxy-functional dispersant comprises benzyl methacrylate.

A preferred carboxy-functional dispersant is a copolymer comprising one or more hydrophobic ethylenically unsaturated monomers (preferably at least half of which by weight is benzyl methacrylate), one or more hydrophilic ethylenically unsaturated monomers having one or more carboxy groups; and optionally some or no hydrophilic ethylenically unsaturated monomers having one or more hydrophilic non-ionic groups.

An especially preferred carboxy-functional dispersant is a copolymer comprising:
(i) from 75 to 97 parts of one or more hydrophobic ethylenically unsaturated monomers comprising at least 50 parts of benzyl methacrylate;
(ii) from 3 to 25 parts of one or more hydrophilic ethylenically unsaturated monomers having one or more carboxy groups; and
(iii) 0 to 1 part of hydrophilic ethylenically unsaturated monomers having one or more hydrophilic non-ionic groups;
wherein the parts are by weight.

Typically and the sum of the parts (i), (ii) and (iii) adds up to 100.

It is preferred that the only hydrophobic ethylenically unsaturated monomer in component (i) is benzyl methacylate.

More preferably the carboxy-functional dispersant is a copolymer comprising:

(i) from 80 to 93 parts of one or more hydrophobic ethylenically unsaturated monomers comprising at least 50 parts benzyl methacrylate;
(ii) from 7 to 20 parts of one or more hydrophilic ethylenically unsaturated monomers having one or more carboxy groups;
(iii) 0 to 1 part of hydrophilic ethylenically unsaturated monomers having a hydrophilic non-ionic group;
wherein the parts are by weight.

Typically and the sum of the parts (i), (ii) and (iii) adds up to 100.

Preferably the hydrophobic monomers have no hydrophilic groups, whether ionic or non-ionic. For example, they are preferably free from water-dispersing groups.

Preferably, the hydrophobic ethylenically unsaturated monomers have a calculated log P value of at least 1, more preferably from 1 to 6, especially from 2 to 6.

A review by Mannhold, R. and Dross, K. (Quant. Struct-Act. Relat. 15, 403-409, 1996) describes how to calculate log P values.

Preferred hydrophobic ethylenically unsaturated monomers are styrenic monomers (e.g. styrene and alpha methyl styrene), aromatic (meth)acrylates (especially benzyl (meth)acrylate), $C_{1-30}$-hydrocarbyl (meth)acrylates, butadiene, (meth)acrylates containing poly($C_{3-4}$)alkylene oxide groups, (meth)acrylates containing alkylsiloxane or fluorinated alkyl groups and vinyl naphthalene.

Preferably, the dispersant comprises the repeat units from copolymerising from 75 to 97, more preferably from 77 to 97, especially from 80 to 93 and most especially from 82 to 91 parts by weight of component (i).

Dispersants comprising at least 50 parts of benzyl (meth)acrylate monomer repeat units can provide polymer-encapsulated pigment dispersions with good stability and good optical density.

Component (i) preferably comprises at least 60 parts, more preferably at least 70 and especially at least 75 parts by weight of benzyl (meth)acylate. The remainder required to obtain the overall preferred amounts of hydrophobic monomers may be provided by any one or more of the above hydrophobic monomers other than benzyl (meth)acrylate. Preferably, benzyl (meth)acrylate is benzyl methacrylate (rather than benzyl acrylate).

In a preferred embodiment component (i) comprises only benzyl (meth)acrylate, more preferably only benzyl methacrylate.

Preferably, the monomers in component (ii) have a calculated log p value of less than 1, more preferably from 0.99 to −2, especially from 0.99 to 0 and most especially from 0.99 to 0.5, when calculated in the un-neutralised (e.g. free acid) form.

Preferred hydrophilic ethylenically unsaturated monomers for component (ii) having one or more carboxylic acid groups include beta carboxyl ethyl acrylate, itaconic acid, maleic acid, fumaric acid, crotonic acid, more preferably acrylic acid and especially methacrylic acid. Preferably, these ethylenically unsaturated monomers when polymerised provide the only ionic groups in the dispersant.

In a preferred embodiment component (ii) is or comprises methacrylic acid.

Preferably, the dispersant comprises the repeat units from copolymerising 3 to 25, more preferably 3 to 23, especially 7 to 20 and most especially 9 to 18 parts by weight of component (ii). This is especially so when component (ii) comprises, or more preferably is, methacrylic acid.

For the purposes of the present invention a monomer having both ionic and non-ionic hydrophilic groups is considered to belong to component (iii). Thus, all the ethylenically unsaturated monomers in component (ii) are free from hydrophilic non-ionic groups.

Preferably, the monomers in component (iii) have calculated log P values of less than 1, more preferably of from 0.99 to −2.

Preferably, component (iii) is less than 1 part, more preferably less than 0.5 parts, especially less than 0.1 parts and most especially 0 parts (i.e. absent). In this way the dispersant contains no repeat units from hydrophilic monomers having one or more hydrophilic non-ionic groups.

Examples of hydrophilic non-ionic groups include polyethyleneoxy, polyacrylamide, polyvinyl pyrrolidone, hydroxy functional celluloses and poly vinyl alcohol. The most common ethylenically unsaturated monomer having a hydrophilic non-ionic group is polyethyleneoxy (meth) acrylate.

In embodiments where repeat units from component (iii) are present in the dispersant (for example 1 part by weight of component (iii)) then in one embodiment the amount of component (iii) is deducted from the preferred amounts of component (i). In this way the amounts of all the components (i), (ii) and (iii) still adds up to 100. Thus for embodiments where 1 part by weight of component (iii) is present the preferred amounts of component (i) expressed above would become from 74 to 96 (75-1 to 97-1), more preferably from 76 to 96 (77-1 to 97-1), especially from 79 to 92 (80-1 to 93-1) and most especially from 81 to 90 (82-1 to 91-1) parts by weight of component (i). In an another embodiment it is possible to deduct the amount of component (iii) from the preferred amounts of component (ii) so that again the sum of the amounts of components (i), (ii) and (III) adds up to 100 parts by weight.

The function of the carboxylic acid group(s) in the dispersant is primarily to cross-link with the cross-linking agent and to provide the subsequent polymer-encapsulated pigment particles with the ability to disperse in aqueous ink media. Where carboxylic acid group(s) are the only groups for stabilising the polymer-encapsulated pigment particles in the aqueous medium it is preferable to have a molar excess of carboxylic acid groups to carboxy-reactive groups (e.g. epoxy groups) in the cross-linking agent to ensure that unreacted carboxylic acid groups remain after the cross-linking reaction has been completed. In one embodiment the ratio of moles of carboxylic acid groups to moles of carboxy-reactive groups (e.g. epoxy groups) in the cross-linking agent is preferably from 10:1 to 1.1:1, more preferably from 5:1 to 1.1:1 and especially preferably from 3:1 to 1.1:1.

The dispersant may optionally have other stabilising groups. The choice of the stabilising groups as well as the amounts of such groups will depend to a large extent on the nature of the aqueous medium.

In embodiments where the cross-linking agent has one or more oligomeric dispersing group the dispersant preferably has an acid value of at least 125 mg KOH/g.

The acid value of the dispersant, prior to cross-linking with the cross-linking agent, is preferably from 130 to 320 and more preferably from 135 to 250 mg KOH/g. We have found that dispersants having such acid values provide resultant polymer-encapsulated pigment particles which exhibit good stability in aqueous inks and also have sufficient carboxy groups for subsequent cross-linking with the cross-linking agent. Preferably, the dispersant (prior to cross-linking) has a number average molecular weight of from 500 to 100,000, more preferably from 1,000 to 50,000 and especially from 1,000 to 35,000. The molecular weight may be measured by gel permeation chromatography.

The dispersant need not be totally soluble in the liquid medium used to make the polymer-encapsulated pigment particles. That is to say perfectly clear and non-scattering solutions are not essential. The dispersant may aggregate in surfactant-like micelles giving slightly hazy solutions in the liquid medium. The dispersant may be such that some proportion of the dispersant tends to form a colloid or micellar phase. It is preferred that the dispersant produces uniform and stable dispersions in the liquid medium used to make the polymer-encapsulated pigment particles which do not settle or separate on standing.

It is preferred that the dispersant is substantially soluble in the liquid medium used to make the polymer-encapsulated pigment particles, giving rise to clear or hazy solutions.

Preferred random polymeric dispersants tend to give clear compositions whilst less preferred polymeric dispersants with two or more segments tend to give rise to the aforementioned hazy compositions in liquid media.

Typically the dispersant adsorbs onto the pigment prior to cross-linking so as to form a relatively stable dispersion of the pigment particles. This dispersion is then crosslinked using the cross-linking agent to form the polymer-encapsulated pigment particles. This pre-adsorption and pre-stabilisation in particular distinguishes the present invention from coacervation approaches whereby a polymer or pre-polymer (which is not a dispersant) is mixed with a pigment, a liquid medium and the cross-linking agent and only during or after cross-linking does the resultant cross-linked polymer precipitate onto the pigment.

In embodiments where the dispersant has an acid value of at least 125 mg KOH/g the cross-linking agent may have no oligomeric dispersing groups, but preferably the cross-linking agent has one or more oligomeric dispersing groups.

Cross-linking agents having one or more oligomeric dispersing group increase the stability of the polymer-encapsulated pigment particles in the ink.

The oligomeric dispersing group preferably is or comprises polyalkyleneoxide, more preferably a poly$C_{2-4}$-alkyleneoxide and especially a polyethyleneoxide. The polyalkyleneoxide groups provide steric stabilisation which improves the stability of the resulting encapsulated pigment.

Preferably the polyalkyeneoxide contains from 3 to 200, more preferably from 5 to 50 alkyleneoxide and especially from 5 to 20 alkyleneoxide repeat units.

The cross-linking agent preferably has at least two epoxy groups.

Preferred cross-linking agents having two epoxy groups and zero oligomeric dispersing groups are ethylene glycol diglycidyl ether, resorcinol diglycidyl ether, neopentyl glycol diglycidyl ether, 1,6-hexanediol diglycidyl ether, hydrogenated bisphenol A diglycidyl ether and polybutadiene diglycidyl ether.

Preferred cross-linking agents having two epoxy groups and one or more oligomeric dispersing groups are diethylene glycol diglycidyl ether, poly ethylene glycol diglycidyl ether, dipropylene glycol diglycidyl ether and poly propylene glycol diglycidyl ether.

Preferred cross-linking agents having three or more epoxy groups and zero oligomeric dispersing groups are sorbitol polyglycidyl ether, polyglycerol polyglycidyl ether, pentaerythritol polyglycidyl ether, diglycerol polyglycidyl ether, glycerol poly glycidyl ether and trimethylolpropane polygycidyl ether.

In one embodiment the epoxy cross-linking agent has zero oligomeric dispersing groups.

Examples of oxetane cross-linking agents include 1,4-bis[(3-ethyl-3-oxetanylmethoxymethyl)]benzene, 4,4'-bis[(3-ethyl-3-oxetanyl)methoxy]benzene, 1,4-bis[(3-ethy-3-oxetanyl)methoxyl-benzene, 1,2-bis[(3-ethyl-3-oxetanyl)-methoxy]benzene, 4,4-bis[(3-ethyl-3-oxetanyl)methoxy] biphenyl and 3,3',5,5'-tetramethyl-[4,4'-bis(3-ethyl-3-oxetanyl)methoxy]biphenyl.

Examples of carbodiimide cross-linking agents include crosslinker CX-300 from DSM NeoResins. Carbodiimide cross-linking agents having good solubility or dispersibility in water may also be prepared as described in U.S. Pat. No. 6,124,398, synthetic Examples 1 to 93.

Examples of isocyanate cross-linking agents include isophorone diisocyanate, hexamethylene diisocyanate, toluene diisocyanate, methylene diphenyl diisocyanate, methylene dicyclohexyl diisocyante, 2-methyl-1,5-pentane diisocyanate, 2,2,4-trimethyl-1,6-hexane diisocyante and 1,12-dodecane diisocyanate, 1,11-diisocyanatoundecane, 1,12-diisocyanatododecane, 2,2,4- and 2,4,4-trimethyl-1,6-diisocyanatohexane, 1,3-diisocyanatocyclobutane, 4,4'-bis-(isocyanatocyclohexyl)-methane, hexamethylene diisocyanate, 1,2-bis-(isocyanatomethyl)-cyclobutane, 1,3- and 1,4-bis-(isocyanatomethyl)cyclohexane, hexahydro-2,4- and/or -2,6-diisocyanatoluene, 1-isocyanato-2-isocyanatomethyl cyclopentane, 1-isocyanato-3-isocyanatomethyl-3,5,5-trimethyl-cyclohexane, 2,4'-dicyclohexylmethane diisocyanate, and 1-isocyanato-4(3)-isocyanatomethyl-1-methyl cyclohexane, tetramethyl-1,3- and/or -1,4-xylylene diisocyanate, 1,3- and/or 1,4-phenylene diisocyanate, 2,4- and/or 2,6-toluene diisocyanate, 2,4- and/or 4,4'-diphenyl-methane diisocyanate, 1,5-diisocyanatonaphthalene, and p-xylylene diisocyanate. Suitable diisocyanates are also understood to include those containing modification groups such as biuret, uretdione, isocyanurate, allophanate and/or carbodiimide groups, as long as they contain two or more isocyanate groups. For isocyanates the liquid medium is preferably non-aqueous, although water can sometimes be tolerated with blocked isocyanates.

In a preferred embodiment, the polyisocyanate cross-linking agent contains three isocyanate groups. A convenient source of triisocyanate functional compounds is the known isocyanurate derivative of diisocyanates. Isocyanurate derivatives of diisocyanates can be made by reacting the diisocyanate together with a suitable trimerization catalyst. An isocyanurate derivative is produced that contains an isocyanurate core with pendant organic chains terminated by three isocyanate groups. Several isocyanurate derivatives of diisocyanates are commercially available. In one preferred embodiment, the isocyanurate used is the isocyanurate of isophorone diisocyanate. In another preferred embodiment, the isocyanaurate of hexamethylene diisocyanate is used.

Examples of N-methyol cross-linking agents include dimethoxydihydroxy ethylene urea; N,N-dimethylol ethyl carbamate; tetramethylol acetylene diurea; dimethylol urone; dimethylol ethylene urea; dimethylol propylene urea; dimethylol adipic amide; and mixtures comprising two or more thereof.

Examples of keteneimine cross-linking agents include compounds of formula $Ph_2C=C=N-C_6H_4-N=C=CPh_2$ wherein each Ph independently is an optionally substituted phenyl group.

Examples of hydrazide cross-linking agents include malonic dihydrazide, ethylmalonic dihydrazide, succinic dihydrazide, glutaric dihydrazide, adipic dihydrazide, isophthalic dihydrazide, oxalyl dihydrazide and pimelic dihydrazide.

Commercially available highly reactive oxazoline cross-linking agents are available from, for example, Nippon Shokubai under the Epocross® trade mark. These include the emulsion type (e.g. the Epocross K-2000 Series, such as K-2010E, K-2020E and K-2030E) and the water-soluble types (e.g. the Epocross WS Series, such as WS-300, WS-500 and WS-700).

Examples of aziridine cross-linking agents include ethylene imine-based polyaziridines (e.g. PZ-28 and PZ-33 available from PolyAziridine LLC, Medford, N.J.); XC-103 tri-functional aziridines, XC-105 polyfunctional aziridines and Crosslinker XC-113 (available from Shanghai Zealchem Co., Ltd., China); polyfunctional aziridine liquid crosslinker SaC-100 (available from Shanghai UN Chemical Co., Ltd, China); The aziridines cross-linking agents disclosed in WO 2009/120420; NeoCryl® CX-100 (available from DSM NeoResins); Xama® polyfunctional aziridines (available from Lubrizol); trimethylolpropane tris(beta-aziridino)propionate, neopentylglycol di(beta-aziridino)propionate, glyceryl tris(beta-aziridino)propionate, pentaerythrityltetra(beta-aziridino)propionate, 4,4'-isopropylidenediphenol di(beta-aziridino)propionate, 4,4'-methylenediphenol di(beta-aziridino); and mixtures comprising two or more thereof.

Particularly preferred cross-linking agents are polyethylene glycol diglycidyl ether (e.g. having an average molecular weight 526, obtainable from Aldrich) and/or trimethylolpropane polyglycidyl ether (e.g. Denacol® EX-321, obtainable from Nagase Chemtex, with weight per epoxy of 140).

Preferred methods for making the self-dispersible pigment are described in WO2006/064193 and WO2010/038071. In essence, a dispersant having carboxy groups is adsorbed onto a pigment and then some (but not all) of the carboxy groups are crosslinked to give a pigment dispersion where the pigment is permanently trapped within the cross-linked dispersant. Self-dispersible pigments such as these (according to the present invention) are commercially available from FUJIFILM Imaging Colorants Limited as Pro-Jet® APD 1000 pigments and Pro-Jet® APD 4000 pigments.

The self-dispersible pigments for use in the present invention may be prepared as described below.

(i) Preparation of the Dispersant

A dispersant was prepared by solution copolymerisation of benzyl methacrylate and methacrylic acid at weight proportions of 78.5 to 21.5 respectively. The dispersant was isolated in the form of a dry solid and had an acid value of 2.5 mmoles of acid groups/g of dispersant.

(ii) Preparation of the Dispersant Solution

The dispersant, 200 parts was dissolved in water to make up to 1000 parts and neutralised with potassium hydroxide aqueous solution to give an aqueous solution having a pH of about 9 containing approximately 20% by weight of the dispersant (1).

(iii) Preparation of the Pigment Mill-Bases

Black Mill-Base

Pigment powder (90 parts of a Carbon Black pigment) and the dispersant solution (1) (180 parts) were mixed together to form a pre-mixture. Water was added to the pre-mixture as appropriate to provide a suitable viscosity for mixing and milling.

The pre-mixture was thoroughly mixed together. After mixing the mixture was transferred to a bead mill containing milling beads. The mixture was then milled for several hours until the desired particle size of approximately 110 nm had been reached. The particle size was the Z averaged particle size as measured by a Malvern Zetasizer®.

The milling beads were then removed from the milled mixture. This resulted in a black mill-base.

Magenta Mill-Base

The magenta Mill-base was prepared in exactly the same way as the black mill-base (1) except that a magenta pigment (85 parts of C.I. Pigment 122) and 127.5 parts of dispersant solution were used. For the magenta mill-base (1) milling was continued for several hours until a particle size of approximately 120 nm had been obtained.

Yellow Mill-Base

The yellow mill-base was prepared in exactly the same way as the black mill-base except that a yellow pigment (100 parts of C.I. Pigment Yellow 74) and 250 parts of the dispersant solution. For the yellow mill-base (1) the milling was continued for several hours until a particle size of approximately 120 nm had been obtained.

Cyan Mill-Base 150 parts of a C.I. Pigment Blue 15:3 powder and the dispersant solution (225 parts) were mixed together to form a pre-mixture. Water was added to the pre-mixture as appropriate to provide a suitable viscosity for mixing and milling.

The pre-mixture was thoroughly mixed together. After mixing the mixture was transferred to a bead mill containing milling beads. The mixture was then milled for several hours until the desired particle size of approximately 120 nm had been reached.

(iv) Preparation of the Self-Dispersible Pigment

The mill-bases prepared above were adjusted to a solids content of about 10% by weight by the addition of pure water.

The dispersants in each of the mill-bases were then cross-linked using a cross-linking agent, (Denacol™ EX-321 obtained from Nagase ChemteX, with weight per epoxy=140, hereafter abbreviated as EX-321). This cross-linked the carboxylic acid groups in the dispersant and thereby encapsulated the pigment. The cross-linking reaction was controlled by the presence of a small amount of boric acid (obtained from Aldrich). The cross-linking reaction was effected by heating the above described mixture to a temperature of about 65° C. for 5 hours. This resulted in the self-dispersible pigments shown in Table 1.

| Cross-linking | | | |
|---|---|---|---|
| Self-dispersible pigment | Mill-base (parts) | Cross-linking agent (parts) | Boric acid (parts) |
| Cyan Pigment | Cyan Mill-base 1 (3) | EX321 (6.3) | 2.78 |
| Magenta Pigment | Magenta Mill-base 1 (3) | EX321 (3.57) | 1.58 |
| Yellow Pigment | Yellow Mill-base 1 (3) | EX321 (4.9) | 2.16 |
| Black Pigment | Black Mill-base 1 (3) | EX321 (5.04) | 2.23 |

(v) Purification of the Self-Dispersible Pigment

The self-dispersible pigments prepared above were each purified by means of ultrafiltration. The self-dispersible pigment dispersions were diafiltered with pure water. The ultrafiltration membrane was then used to concentrate the self-dispersible pigment dispersions back to a solids content of around 10 to 13% by weight.

Preferably, the ink to be used in the ink-jet printing process is a volatile water based ink which can be printed in line and dried quickly, either unassisted or with a low temperature drying process.

The ink for use in the process of the present invention preferably comprises:

(a) 0.1 to 10 parts of a self-dispersible pigment which comprises a carboxy-functional dispersant crosslinked around a pigment core by a cross-linking agent having at least two groups selected from oxetane, carbodiimide, hydrazide, oxazoline, aziridine, isocyanate, N-methylol, keteneimine, isocyanurate and epoxy groups;

(b) 5 to 15 parts of one or more polar organic solvent(s) with a solubility parameter at 25° C. greater than 27.5;

(c) 0.05 to 2 parts of an acetylenic surfactant;

(d) 0.001 to 5 parts of biocide;

(e) 0 to 15 parts of a viscosity modifier;

(f) 0 to 5 parts of one or more organic solvents with a solubility parameter at 25° C. less than 27.5;

(g) 0 to 8 parts of a latex binder;

(h) 0 to 15 parts of polyvinyl alcohol; and (i) the balance to 100 parts water.

Component (a) is preferably present in the range of from 0.5 to 7.5 parts and more preferably in the range of from 2 to 6 parts. Mixture of different self-dispersible pigments, as preferred above, may be used in component (a).

Component (b) may comprise any suitable polar organic solvent with a solubility parameter greater than 27.5 at 25° C.

Preferably component (b) comprises a protic polar organic solvent.

Suitable solvents include glycerol, 2-pyrrolidone, ethylene glycol, propylene glycol, diethylene glycol, dipropylene glycol and triethylene glycol.

Preferably component (b) comprises 1 to 3 solvents selected from the list consisting of; glycerol, 2-pyrrolidone, ethylene glycol, diethylene glycol dipropylene glycol and triethylene glycol. More preferably component (b) comprises 2 or 3 solvents selected from the list consisting of; glycerol, 2-pyrrolidone, ethylene glycol and diethylene glycol. It is especially preferred that component (b) comprises 3 solvents selected from the list consisting of; glycerol, 2-pyrrolidone, ethylene glycol and diethylene glycol.

The solubility parameter is the standard Hildebrand solubility parameter which is expressed in mega Pascals. Values for the Hildebrand solubility parameters of solvents may be found in Barton, *Handbook of Solubility Parameters*, CRC Press, 1983.

Any acetylenic surfactant may be used as component (c). However, 2,4,7,9-tetramethyl-5-decyne-4,7-diol and ethylene oxide condensates thereof are preferred. These compounds are available as the Surfynol® range of surfactants from Air Products Mixtures containing different surfactants may be used.

Component (c) is preferably present in the composition in an amount of 0.1 to 1.5 parts.

The surfactant is a key component in the inks of the present invention. The choice of both the surfactant and its concentration in a particular ink is essential in ensuring that the ink jets effectively.

It is essential that the surfactant does not cause the ink to foam.

It is also desirable that the ink is designed so that it does not wet print-head face-plates that are not treated with a "non-wetting coating". These face-plates may show a contact angle with water of less than 90°, or less than 80°. Face-plates that are specifically designed to be non-wetting may have a contact angle with water of more than 90° C., sometimes more than 95°, and sometimes even more than 100°.

To achieve these properties it is desirable that the ink shows a dynamic surface tension range, i.e. that its surface tension is dependent on the surface age. The surface tension of a newly created surface is high, but drops as surfactant, or other surface active species, migrate to the surface. The dynamic surface tension range may be determined by measurements in a bubble tensiometer. This measures the surface tension as a function of surface age or bubble frequency. It is preferred that the surface tension measured at 10 ms ($\gamma(10)$) is >35 dynes/cm, and the surface tension measured at 1,000 ms ($\gamma(1000)$) is in the range 20 to 40 ynes/cm, with $\gamma(10) > \gamma(1000)$. Alternatively the equilibrium surface tension of the ink can be compared with that of the equivalent ink made without inclusion of the surfactant(s). It is preferred that the equilibrium surface tension without surfactant is at least 10 dynes/cm higher than that where the surfactant(s) is (or are) present.

For component (d) any biocide (or mixture of biocides) which is stable in the ink may be used. It is particularly preferred that the biocide comprises 1,2-benzisothazolin-3-one which is available as a 20% active solution from Lonza as Proxel® GXL and Bioban®, DXN (2,6-dimethyl-1,3-dioxan-4-yl acetate), from Dow Chemical Company.

The viscosity modifier, component (e), is preferably selected from the group consisting of polyethers, (such as polyethylene glycol and poly(ethylene oxide)), cellulose polymers such as hydroxyethyl cellulose, hydroxypropyl cellulose and carboxymethyl cellulose, water-soluble acrylics, water-soluble polyesters, water-soluble polyurethanes, homopolymers of 2-ethyl-oxazoline (e.g. poly-2-ethyl-2-oxazoline), poly(vinyl alcohol) and poly(vinylpyrrolidones) and mixtures thereof.

Component (e) is preferably poly(ethylene glycol) or poly(ethylene oxide), an acrylic polymer or a polyurethane, including a hydrophobically modified polyurethane. More preferably component (e) is polyethylene glycol especially polyethylene glycol 20,000.

Component (e) is preferably present in the composition in an amount of from 0.1 to 12 parts and more preferably in an amount of from 5 to 10 parts.

Other polar solvents with a solubility parameter less than 27.5 at 25° C. may optionally be present in the ink. Preferably the inks of the present invention comprise less than 3 parts, more preferably less than 2 parts, especially less than 1 part and more especially are free from solvents with a solubility parameter less than 27.5 at 25° C. Thus, preferably component (f) is 0.

Component (g), the latex binder, is preferably a styrene butadiene, styrene acrylic or polyurethane latex binder.

The ink may contain more than one latex binder. The latex binders may differ in their properties, such as particle size, glass transition temperature or molecular weight.

Preferably component (g) is a styrene butadiene latex binder.

Preferably the styrene butadiene latex binder has a Tg in the range of from 0° C. to 120° C., more preferably in the range of from 10° C. to 110° C. and especially in the range of from 50° C. to 90° C.

The Tg is determined by Differential Scanning calorimetry on the dried latex. The Tg is taken as being the midpoint value from a re-heat Differential Scanning calorimetry scan (i.e. after an initial heat and cool).

Preferably the styrene butadiene latex binder is prepared by emulsion polymerisation.

The molecular weight of the styrene butadiene latex binder can be controlled by methods known in the art, for example, by use of a chain transfer agent (e.g. a mercaptan) and/or by control of initiator concentration in the case of emulsion polymerisation, and/or by heating time. Preferably the styrene butadiene latex binders have a molecular weight of greater than 20,000 Daltons and more preferably of greater than 100,000 Daltons. It is especially preferred that the molecular weight of the styrene butadiene latex binder is greater than 200,000 Daltons.

The styrene butadiene latex binder may be monomodal, preferably with an average particle size of below 1000 nm, more preferably below 200 nm and especially below 150 nm. Preferably, the average particle size of the styrene butadiene latex binder is at least 20 nm, more preferably at least 50 nm. Thus, the styrene butadiene latex binder may preferably have an average particle size in the range of from 20 to 200 nm and more preferably in the range of from 50 to 150 nm. The average particle size of the styrene butadiene latex binder may be measured using photon correlation spectroscopy The styrene butadiene latex binder may also show a bimodal particle size distribution. This may be achieved either by mixing two or more latexes of different particle size, or by generating the bimodal distribution directly, for example by two-stage polymerisation. Where a bimodal particle size distribution is used it is preferred that the lower particle size peak is in the range 20-80 nm, and the higher particle size peak is in the range 100-500 nm. It is further preferred that the ratio of the two particle sizes is at least 2, more preferably at least 3 and most preferably at least 5.

The molecular weight of the styrene butadiene latex binder may be determined by Gel Permeation Chromatography against polystyrene standards using an Agilent HP1100 instrument with THF as eluent and PL Mixed Gel C columns.

The styrene butadiene latex binder once formed is preferably screened to remove oversized particles prior to use, for example through a filter having an average pore size below 3 µm, preferably 0.3 to 2 µm, especially 0.5 to 1.5 µm. The styrene butadiene latex binder may be screened before, during or after it is mixed with other components to form the ink.

Commercially available styrene butadiene latex binders may be used in the ink according to the present invention.

Examples of commercially available styrene butadiene latex binders which can be used in the ink of the pre present invention include styrene butadiene latexes in the Rovene® range supplied by Mallard Creek polymers, particularly Rovene 5499 and Rovene 4111 and especially Rovene 4111.

Component (g) is preferably in the range of from 2 to 6 parts.

Component (h), polyvinyl alcohol, preferably has an average molecular weight of from 1,000 to 1,000,000, more preferably of from 10,000 to 300,000, especially of from 25,000 to 150,000 and more especially in the range of from 70,000 to 90,000.

The Tg of the polyvinyl alcohol is preferably in the range of from 45 to 120° C., MW=25K-150K, prefer 70-90K The polyvinyl alcohol is preferably from 60% to 98% hydrolysed and more preferably of from 80% to 90% hydrolysed, to improve the dissolution characteristics of the polymer.

Component (h) is preferably in the range of from 3 to 10 parts.

Since component (h) will have an effect on the viscosity of the ink the optimum level will be dependent on its molecular weight and which other components are present.

The ink preferably has a MFFT below 65° C., especially below 60° C.

The MFFT is the lowest temperature at which components of the ink components will coalesce to form a film, e.g. during ink drying.

Equipment for measuring MFFT is commercially available, for example the Minimum Film Forming Temperature Bar is available from Rhopoint Instruments (the "MFFT Bar 90"). The MFFT Bar 90 comprises a temperature bar having a nickel-plated copper platen with an electronically imposed temperature gradient. Ten equally spaced sensors beneath the surface provide instantaneous temperature measurement along the bar. The desired temperature program is selected and the instrument allowed to reach thermal equilibrium. Tracks of wet test ink may be applied using a cube applicator, or spreader. Once the ink has dried the device shows the MFFT. If for any reason the above mentioned commercially available equipment does not work on the ink (e.g. due to a low latex content and/or the ink's colour), one may instead place a small amount of the ink in a dish and heat the dish containing the ink at the desired assessment temperature (e.g. 70° C.) for 24 hours and then rub the surface with a gloved finger to assess whether a film has formed. If a film has formed there will be little or no ink transfer to the gloved finger, whereas if a film has not formed there will be a significant transfer of ink to the gloved finger or the dried ink will crack.

The desired MFFT may be achieved by selecting appropriate combinations of polymer latex and organic solvents. If the MFFT of an ink is too high, the amount of coalescing solvent may be increased and/or a polymer latex of lower Tg may be used in order to bring the ink MFFT into the desired range. Therefore at the ink design stage one may decide whether to include more or less coalescing solvent and higher or lower Tg polymer latex, depending on the desired MFFT.

The ink jet printing ink preferably has a surface tension from 20 to 65 dynes/cm, more preferably from 20 to 50 dynes/cm, especially 32 to 42 dynes/cm and more especially 32 to 38 dynes/cm, when measured at 25° C. using Kruss K100 tensiometer.

Preferably, the ink composition has been filtered through a filter having a mean pore size of less than 10 microns, more preferably less than 5 microns and especially less than 1 micron.

The ink has a pH in the range of from 7.5 to 9.5 and more preferably in the range of from 8.2 to 9.0. The pH may be adjusted by means of a suitable buffer.

Recirculating print heads of the type preferred in the present invention are usually equipped with a reservoir heater and a thermistor to control the jetting temperature.

Preferably ink-jet printing ink of the first aspect of the invention is applied at a temperature in excess of 32° C.

In one preferred print head the drop volume of the ink applied by the ink-jet printer is in the range of from 20 to 100 pl and the viscosity of the ink-jet printing ink at the jetting temperature is in the range of from 8 to 20 mPa·s and more preferably in a range of from 11 to 14 mPa·s at 32° C. when measured using a Brookfield spindle SC4-18 at 150 rpm.

In a second preferred print head the drop volume of the ink-jet printing ink is preferably in the range of from 1 to 20 pl and the viscosity of the ink-jet printing ink at the jetting temperature is in the range of from 4 to 6 mPa·s.

In addition to the above mentioned components, the ink composition may optionally comprise one or more ink additives. Preferred additives suitable for ink-jet printing inks are rheology modifiers, corrosion inhibitors and chelating agents. Preferably, the total amount of all such additives is no more than 10 parts by weight. These additives are added to and comprise part of component (i), the water added to the ink.

In a first preferred embodiment the ink comprises:
(1) 0.5 to 7.5 parts of a self-dispersible pigment which comprises a carboxy-functional dispersant crosslinked around a pigment core by a cross-linking agent having at least two groups selected from oxetane, carbodiimide, hydrazide, oxazoline, aziridine, isocyanate, N-methylol, keteneimine, isocyanurate and epoxy groups;
(2) 1 to 10 parts of a first protic polar organic solvent with a solubility parameter at 25° C. greater than 27.5;
(3) 1 to 10 parts of a second protic polar organic solvent with a solubility parameter at 25° C. greater than 27.5;
(4) 1 to 10 parts of a third polar protic organic solvent with a solubility parameter at 25° C. greater than 27.5;
(5) 0.2 to 2 parts of an acetylenic surfactant;
(6) 0.001 to 2 parts of biocide;
(7) 1 to 15 parts of a viscosity modifier;
(8) the balance to 100 parts water.

In this first preferred embodiment the ink more preferably comprises:
($1^1$) 2.5 to 7.5 parts of a self-dispersible pigment which comprises a carboxy-functional dispersant crosslinked around a pigment core by a cross-linking agent having at least two groups selected from oxetane, carbodiimide, hydrazide, oxazoline, aziridine, isocyanate, N-methylol, keteneimine, isocyanurate and epoxy groups;
($2^1$) 1 to 10 parts of glycerol;
($3^1$) 0.5 to 5 parts of ethylene glycol;
($4^1$) 1 to 10 parts of 2-pyrrolidone;
($5^1$) 0.2 to 2 parts of an acetylenic surfactant;
($6^1$) 0.001 to 2 parts of biocide;
($7^1$) 1 to 15 parts of polyethylene glycol 20,000;
($8^1$) the balance to 100 parts water.

In a second preferred embodiment the ink comprises:
($1^a$) 0.5 to 7.5 parts of a self-dispersible pigment which comprises a carboxy-functional dispersant crosslinked around a pigment core by a cross-linking agent having at least two groups selected from oxetane, carbodiimide, hydrazide, oxazoline, aziridine, isocyanate, N-methylol, keteneimine, isocyanurate and epoxy groups;
($2^a$) 1 to 10 parts of a first protic polar organic solvent with a solubility parameter at 25° C. greater than 27.5;
($3^a$) 1 to 10 parts of a second protic polar organic solvent with a solubility parameter at 25° C. greater than 27.5;
($4^a$) 1 to 10 parts of a third protic polar organic solvent with a solubility parameter at 25° C. greater than 27.5;
($5^a$) 0.2 to 2 parts of an acetylenic surfactant;
($6^a$) 0.001 to 2 parts of biocide;
($7^a$) 2 to 6 parts of a latex binder;
($8^a$) 0 to 15 parts of a viscosity modifier and
($9^a$) the balance to 100 parts water.

In the second preferred embodiment the ink more preferably comprises:
($1^b$) 2.5 to 7.5 parts of a self-dispersible pigment which comprises a carboxy-functional dispersant crosslinked around a pigment core by a cross-linking agent having at least two groups selected from oxetane, carbodiimide, hydrazide, oxazoline, aziridine, isocyanate, N-methylol, keteneimine, isocyanurate and epoxy groups;
($2^b$) 1 to 10 parts of glycerol;
($3^b$) 0.5 to 5 parts of ethylene glycol;
($4^b$) 1 to 10 parts of 2-pyrrolidone;
($5^b$) 0.2 to 2 parts of an acetylenic surfactant;
($6^b$) 0.001 to 2 parts of biocide;
($7^b$) 2 to 6 parts of a styrene butadiene latex binder;

($8^b$) 1 to 15 parts of polyethylene glycol 20,000
($9^b$) the balance to 100 parts water.

In a third preferred embodiment the ink comprises:
($1^c$) 0.5 to 7.5 parts of a self-dispersible pigment which comprises a carboxy-functional dispersant crosslinked around a pigment core by a cross-linking agent having at least two groups selected from oxetane, carbodiimide, hydrazide, oxazoline, aziridine, isocyanate, N-methylol, keteneimine, isocyanurate and epoxy groups;
($2^c$) 1 to 10 parts of a first protic polar organic solvent with a solubility parameter at 25° C. greater than 27.5;
($3^c$) 1 to 10 parts of a second protic polar organic solvent with a solubility parameter at 25° C. greater than 27.5;
($4^c$) 1 to 10 parts of a third polar protic organic solvent with a solubility parameter at 25° C. greater than 27.5;
($5^c$) 0.2 to 2 parts of an acetylenic surfactant;
($6^c$) 0.001 to 2 parts of biocide;
($7^c$) 0 to 6 parts of a latex binder;
($8^c$) 0 to 15 parts of a viscosity modifier
($9^c$) 3 to 10 parts of polyvinyl alcohol; and
($10^c$) the balance to 100 parts water.

In the third preferred embodiment the ink more preferably comprises:
($1^d$) 2.5 to 7.5 parts of a self-dispersible pigment which comprises a carboxy-functional dispersant crosslinked around a pigment core by a cross-linking agent having at least two groups selected from oxetane, carbodiimide, hydrazide, oxazoline, aziridine, isocyanate, N-methylol, keteneimine, isocyanurate and epoxy groups;
($2^d$) 1 to 10 parts of glycerol;
($3^d$) 0.5 to 5 parts of ethylene glycol;
($4^d$) 1 to 10 parts of 2-pyrrolidone;
($5^d$) 0.2 to 2 parts of an acetylenic surfactant;
($6^d$) 0.001 to 2 parts of biocide;
($7^d$) 0 to 6 parts of a styrene butadiene latex binder;
($8^d$) 0 to 15 parts of polyethylene glycol 20,000;
($9^d$) 3 to 10 parts of polyvinyl alcohol; and
($10^d$) the balance to 100 parts water.

The ink-jet printer in the method of the present invention preferably applies an ink-set comprising two or more different coloured inks as described and preferred above. These ink-sets may contain inks other than those defined and described above.

In one preferred embodiment the ink-set comprises an ink-set comprising a black ink, a cyan ink, a yellow ink and a magenta ink wherein the inks are as described and preferred above. Preferably the pigment in the black ink is carbon black; in the cyan ink is Pigment Blue 15:3; in the yellow ink is Pigment Yellow 74 (or Pigment Yellow 155); and in the magenta ink is Pigment Red 122.

Thus in the method of printing of the present invention, in one preferred embodiment, step (A) comprises ink-jet printing an ink-set comprising a black ink, a cyan ink, a yellow ink and a magenta ink onto a water soluble material.

Another preferred embodiment provides an ink-set comprising a black ink, red ink, and a white ink wherein the black ink and red ink are as described and preferred above. Preferably the pigment in the black ink is carbon black and in the red ink is a mixture of Pigment Red 122 and Pigment Yellow 74 and the white ink comprises titanium dioxide. These inks sets may also a cyan ink, a yellow ink and a magenta ink as described and preferred above.

Thus in the method of printing of the present invention, in a further preferred embodiment, step (A) comprises ink-jet printing an ink-set comprising black ink, red ink, and a white ink wherein the self-dispersing pigments in the black and red inks comprise a carboxy-functional dispersant crosslinked around a pigment core by a cross-linking agent having at least two groups selected from oxetane, carbodiimide, hydrazide, oxazoline, aziridine, isocyanate, N-methylol, keteneimine, isocyanurate and epoxy groups and the white ink comprises titanium dioxide.

Preferably the white ink comprises:
(a) from 1 to 25 parts of titanium dioxide pigment;
(b) from 0 to 8 parts of a styrene butadiene latex binder or styrene acrylic binder;
(c) from 0 to 8 parts of a polyurethane latex binder;
(d) from 0 to 5 parts of a glycol selected from the group consisting of ethylene glycol, diethylene glycol, propylene glycol, dipropylene glycol or triethylene glycol;
(e) from 1 to 10 parts of 2-pyrrolidone;
(f) from 1 to 10 parts of glycerol;
(g) from 0.01 to 2 parts of an acetylenic surfactant;
(h) from 0.001 to 5 parts of biocide;
(i) from 0 to 10 parts of a viscosity modifier; and
(j) the balance to 100 parts water; provided that (b) plus (c) is greater than 0.

More preferably the white ink comprises:
(a') from 5 to 20 parts of titanium dioxide pigment;
(b') from 2 to 6 parts of a styrene butadiene latex binder;
(c') from 0.5 to 2.5 parts of ethylene glycol;
(d') from 2.5 to 7.5 parts of 2-pyrrolidone;
(e') from 2 to 7.5 parts of glycerol;
(f') from 0.05 to 1.0 parts of an acetylenic surfactant;
(g') from 0.001 to 2 parts of biocide;
(h') the balance to 100 parts water.

In the white ink, the titanium dioxide may be in rutile or anatase form or a mixture of the two forms.

Preferably the titanium dioxide pigment is a surface treated titanium dioxide pigment.

The titanium dioxide pigment particles can have a wide variety of average particle sizes of about 1 micron or less, depending on the desired end use application of the ink.

The titanium dioxide pigment is in and of itself white in color.

For applications demanding high hiding or decorative printing applications, the titanium dioxide particles preferably have a Z average mean particle diameter of less than 1 micron (1000 nm). Preferably, the particles have a Z average mean particle diameter of from 50 to 950 nm, more preferably from 75 to 750 nm, and still more preferably from 100 to 500 nm. It is especially preferred that the titanium dioxide particles have a Z average mean particle diameter of from 125 to 350 nm and more especially of from 150 to 300 nm. The Z average mean particle diameter may be readily measured using a Zetasizer® from Malvern Instruments. Titanium dioxide particles of this size are commonly called pigmentary titanium dioxide.

For applications demanding white color with some degree of transparency, the pigment preference is "nano" titanium dioxide. "Nano" titanium dioxide particles typically have a Z average mean particle diameter ranging from about 10 to about 200 nm, preferably from about 20 to about 150 nm, and more preferably from about 35 to about 75 nm. An ink comprising nano titanium dioxide can provide improved chroma and transparency, while still retaining good resistance to light fade and an appropriate hue angle.

In addition, unique advantages may be realized with multiple particle sizes, such as opaqueness and UV protection. These multiple sizes can be achieved by adding both a pigmentary and a nano grade of titanium dioxide.

The Zetasizer polydispersity index, measured using a Zetasizer from Malvern Instruments, of the titanium dioxide particles in the ink is preferably less than 0.2. The titanium dioxide pigment is preferably incorporated into an ink formulation via a slurry concentrate composition. The amount of titanium dioxide present in the slurry composition is preferably from about 20 wt % to about 80 wt %, based on the total slurry weight.

The titanium dioxide pigment may be substantially pure titanium dioxide or may comprise other metal oxides. These other metal oxides are preferably one or more selected from the group consisting of silica, alumina, zirconia, titanate and mixtures thereof. Other metal oxides may become incorporated into the pigment particles, for example, by co-oxidizing or co-precipitating titanium compounds with other metal compounds. If the titanium dioxide pigment comprises co-oxidized or co-precipitated metals, they are preferably present as the metal oxide in an amount from 0.1 wt % to 20 wt %, more preferably from 0.5 wt % to 5 wt %, and still more preferably from 0.5 wt % to 1.5 wt %, based on the total titanium dioxide pigment weight.

In a preferred embodiment the surface of the surface treated titanium dioxide pigment is coated with an inorganic compound selected from the group consisting of silica, alumina, alumina-silica or zirconia. More preferably the surface of the surface treated titanium dioxide is treated with alumina, silica or a mixture thereof. Such coatings may be present in an amount of from 0.1 wt % to 10 wt %, and preferably from 0.5 wt % to 3 wt %, based on the total weight of the titanium dioxide.

The surface of the surface treated titanium dioxide may also carry one or more organic surface coatings. The organic surface coatings are, for example, selected from the group consisting of carboxylic acids, silanes, siloxanes and hydrocarbon waxes, and their reaction products. The amount of organic surface coating generally ranges from 0.01 wt % to 6 wt %, preferably from 0.1 wt % to 3 wt % and more preferably from 0.5 wt % to 1.5 wt % based on the total weight of the titanium dioxide.

Preferred surface treatments for the surface treated titanium dioxide include alumina, silicate, methicone, polydimethylsiloxyethyl, dimethicone, triethoxysilylethyl, polydimethylsiloxyethyl dimethicone, PEG-10 dimethicone, PEG-9 polydimethylsiloxyethyl dimethicone, PEG-8 methyl ether triethoxysilane, isopropyl titanium triisostearate and triethoxycaprylylsilane. The surface treatments for the surface treated titanium dioxide can also be a hybrid treatments such as polyhydroxystearic acid and silane (especially triethoxycaprylylsilane and polyhydroxystearic acid), isopropyl titanium triisostearate and alumina and triethoxysilylethyl polydimethylsiloxyethyl dimethicone, isopropyl titanium triisostearate and triethoxysilylethyl polydimethylsiloxyethyl dimethicone.

In one preferred embodiment the surface treated titanium dioxide pigment is treated so it has a hydrophilic character.

In a preferred embodiment the surface of the surface treated titanium dioxide pigment is treated with alumina, silica or a mixture thereof.

Preferably the surface treated titanium dioxide is a cosmetic grade material.

The titanium dioxide pigment is preferably present in the range of from 2 to 23 parts and more preferably of from 5 to 20 parts.

The other components are as described and preferred above.

In step B), overprinting the image formed in step A) with a water-soluble overprint varnish may be achieved using any suitable method of printing.

For example, a second ink-jet printer may be used.

Alternately, the water-soluble overprint varnish could be applied by a second print head after formation of the image.

Other suitable methods of printing include, but are not limited to, rotogravure, lithography, flexography, porous and screen printing, ink-jet printing, letterpress and tampography printing However, in step B) it is preferred that overprinting the image formed in step A) with a water soluble overprint varnish is by flexographic or ink-jet printing and more preferably by flexographic printing.

Flexographic printing is a direct rotary printing method, which uses flexible printing plates generally made of rubber or plastic. The printing plates, which have a mirror image of the desired image slightly raised above the non-printing area are rotated on a cylinder which transfers the image to the substrate.

The water-soluble overprint varnish comprises at least one water soluble polymer and must be able to rapidly dissipate under the same conditions as the water soluble material.

Preferably, the water soluble polymer is selected from the group consisting of polyvinyl alcohols; polyvinyl pyrrolidone; polyalkylene oxides; acrylamide; acrylic acid; cellulose; cellulose ethers; cellulose esters; cellulose amides; polyvinyl acetates; polycarboxylic acids and salts; polyaminoacids or peptides; polyamides; polyacrylamide; copolymers of maleic/acrylic acids; polysaccharides, including starch; gelatine; natural gums, such as xanthum and carragum; polyacrylates and water-soluble acrylate copolymers; methylcellulose; carboxymethylcellulose sodium; dextrin, ethylcellulose; hydroxyethyl cellulose; hydroxypropyl methylcellulose; dextrins (such as maltodextrin), polymethacrylates and poly(2-oxazolines). More preferably the water-soluble polymer comprises a polymeric polymer selected from polyvinyl alcohols, polyvinyl alcohol copolymers and hydroxypropyl methyl cellulose (HPMC), and combinations thereof. Preferably, the level of polymer in the water-soluble polymer is at least 60%.

Mixtures of polymers can be used in the water-soluble polymer. This can be beneficial to control the mechanical and/or dissolution properties of the water-soluble polymer. Thus, it is possible to mix a polymer with a high water-solubility with a polymer with a high mechanical strength.

Also suitable are polymer blend compositions, for example comprising hydrolytically degradable and water-soluble polymer blends such as polylactide and polyvinyl alcohol, obtained by mixing polylactide and polyvinyl alcohol, typically comprising about 1-35% by weight polylactide and about 65% to 99% by weight polyvinyl alcohol.

In a preferred embodiment the polymers are of from 60% to 98% hydrolysed, more preferably of from 80% to 90% hydrolysed, to improve the dissolution characteristics of the polymer.

The water-soluble polymer can also comprise one or more additive ingredients. For example, it can be beneficial to add plasticisers, for example glycerol, ethylene glycol, diethyleneglycol, propylene glycol, sorbitol and mixtures thereof.

The water-soluble polymer preferably comprises polyvinyl alcohol (PVA).

The polyvinyl alcohol preferably has a weight average molecular weight of from 1,000 to 1,000,000, more preferably of from 10,000 to 300,000, especially of from 25,000 to 150,000 and more especially in the range of from 70,000 to 90,000.

The Tg of the polyvinyl alcohol is preferably in the range of from 45 to 120° C.

The water-soluble overprint varnish can also comprise other ink components such as those described above (except for the pigments) for the ink-jet inks.

Preferably the water-soluble overprint varnish comprises in the range of from 1 to 40% water soluble polymer, more preferably in the range of 5 to 30% water soluble polymer.

Preferably the water-soluble overprint varnish also comprises a solvent. The solvent may be any suitable water-miscible solvent selected from those disclosed above. Preferably the solvent is present in the range of from 0.1 to 20%. More preferably the solvent is present in the range of from 0.2 to 2%.

Preferably the solvent comprises methanol.

Typically the water-soluble overprint varnish comprises in addition to the water soluble polymer, a biocide (such as benzisothiazolin-3-one available as Proxel® from Lonza), a small carbon chain alcohol (such as methanol, ethanol, n-propanol, isopropanol, 1,2-butanediol, 1,4-butanediol or 1,5-pentanediol), a bittering agent (such as an edible alkaloid e.g. a hop extract, quinine or denatonium benzoate (bitrex)) and water.

The method for printing of the present invention may also comprise one of more drying steps.

Drying may be carried out by any suitable means.

Thus, drying may be carried out using an air-impingement or parallel flow forced (preferably hot) air.

Medium wavelength-IR, near-IR drying and hybrid drying technologies may also be used.

One preferred embodiment uses medium wavelength IR dryer/impinged air and/or a hot air combination.

Preferably the drying step takes less than 1 minute, more preferably less than 15 seconds, especially less than 5 seconds and more especially 2 seconds or less.

In a preferred method of printing there are two drying steps one after the ink-jet printing step A) and a second after overprinting the image with water soluble overprint varnish in step B).

Based on the above a preferred method of printing on a water soluble material comprises the following steps:
i) ink jet printing an ink onto a water-soluble material comprising polyvinyl alcohol so as to form an image wherein the ink comprises a self-dispersible pigment which comprises a carboxy-functional dispersant cross-linked around a pigment core by a cross-linking agent having at least two groups selected from oxetane, carbodiimide, hydrazide, oxazoline, aziridine, isocyanate, N-methylol, keteneimine, isocyanurate and epoxy groups;
ii) drying the image formed in step i);
iii) overprinting the image formed in step ii) with a water soluble overprint varnish comprising polyvinyl alcohol; and
iv) drying the varnished image from step iii).

In another preferred embodiment in step B) the water-soluble overprint varnish is applied as a film using a bonding agent.

Preferences for the water soluble overprint varnish film are as set out above for the water-soluble material. Preferably the water-soluble overprint varnish film comprises polyvinyl alcohol.

In this preferred embodiment any suitable bonding agent may be used through preferably the bonding agent comprises polyvinyl alcohol.

In a preferred embodiment the method of printing according to the present invention is an integrated process with the components required for printing, drying and overprinting organised inline. In the method of the present invention it is also possible that this offline solution can be integrated inline in a machine such as those used in manufacturing detergent pouches. A schematic of this is shown below in the Experiment section.

Thus, preferably, the integrated process comprises an in-feed roll, an ink-jet printer, a first drying unit, a second printing unit for applying the water soluble overprint varnish (preferably a flexographic or ink-jet printer and more preferably a flexographic printer), a second drying unit and a rewind roll.

A second aspect of the present invention provides a water-soluble material printed by a method as described and preferred in the first aspect of the invention.

A third aspect of the invention provides an ink comprising:
($1^c$) 0.5 to 7.5 parts of a self-dispersible pigment which comprises a carboxy-functional dispersant crosslinked around a pigment core by a cross-linking agent having at least two groups selected from oxetane, carbodiimide, hydrazide, oxazoline, aziridine, isocyanate, N-methylol, keteneimine, isocyanurate and epoxy groups;
($2^c$) 1 to 10 parts of a first protic polar organic solvent with a solubility parameter at 25° C. greater than 27.5;
($3^c$) 1 to 10 parts of a second protic polar organic solvent with a solubility parameter at 25° C. greater than 27.5;
($4^c$) 1 to 10 parts of a third polar protic organic solvent with a solubility parameter at 25° C. greater than 27.5;
($5^c$) 0.2 to 2 parts of an acetylenic surfactant;
($6^c$) 0.001 to 2 parts of biocide;
($7^c$) 0 to 6 parts of a latex binder;
($8^c$) 0 to 15 parts of a viscosity modifier
($9^c$) 3 to 10 parts of polyvinyl alcohol; and
($10^c$) the balance to 100 parts water.

In the third aspect of the invention the ink more preferably comprises:
($1^d$) 2.5 to 7.5 parts of a self-dispersible pigment which comprises a carboxy-functional dispersant crosslinked around a pigment core by a cross-linking agent having at least two groups selected from oxetane, carbodiimide, hydrazide, oxazoline, aziridine, isocyanate, N-methylol, keteneimine, isocyanurate and epoxy groups;
($2^d$) 1 to 10 parts of glycerol;
($3^d$) 0.5 to 5 parts of ethylene glycol;
($4^d$) 1 to 10 parts of 2-pyrrolidone;
($5^d$) 0.2 to 2 parts of an acetylenic surfactant;
($6^d$) 0.001 to 2 parts of biocide;
($7^d$) 0 to 6 parts of a styrene butadiene latex binder;
($8^d$) 0 to 15 parts of polyethylene glycol 20,000;
($9^d$) 3 to 10 parts of polyvinyl alcohol; and
($10^d$) the balance to 100 parts water.

Wherein all components are as described and preferred in the first aspect of the invention.

EXAMPLES

The present invention will now be illustrated by the following examples in which all parts are by weight unless stated to the contrary.

Preparation of the Self-Dispersible Pigment
Preparation of the Dispersant

The dispersant was prepared by solution copolymerisation of benzyl methacrylate and methacrylic acid at weight proportions of 78.5 to 21.5 respectively. The dispersant was isolated in the form of a dry solid and had an acid value of 2.5 mmoles of acid groups/g of dispersant.

Preparation of the Dispersant Solution

The dispersant (200 parts) was dissolved in water to make up to 1000 parts and neutralised with potassium hydroxide aqueous solution to give an aqueous solution having a pH of about 9.

Preparation of Mill-Bases

Black Mill-Base

Pigment powder (90 parts of a Carbon Black pigment) and the dispersant solution (180 parts) were mixed together to form a pre-mixture. Water was added to the pre-mixture as appropriate to provide a suitable viscosity for mixing and milling.

The premixture was thoroughly mixed together. After mixing the mixture was transferred to a bead mill containing milling beads. The mixture was then milled for several hours until the desired particle size of approximately 110 nm had been reached. The particle size was the Z averaged particle size as measured by a Malvern Zetasizer™.

The milling beads were then removed from the milled mixture to give the Black Mill-base.

Magenta Mill-Base

The Magenta Mill-base was prepared in the same way as the Black Mill-base except that a magenta pigment (85 parts of C.I. Pigment 122) and dispersant solution (1) (127.5 parts) were used. For the Magenta Mill-base the milling was continued for several hours until a particle size of approximately 120 nm had been obtained. The particle size was the Z averaged particle size as measured by a Malvern Zetasizer™.

The milling beads were then removed from the milled mixture to give the Magenta Mill-base.

Yellow Mill-Base

The Yellow Mill-base was prepared in the same way as the Black Mill-base except that a yellow pigment (100 parts of C.I. Pigment Yellow 74) and dispersant solution (250 parts) were used. For the Yellow Mill-base the milling was continued for several hours until a particle size of approximately 120 nm had been obtained. The particle size was the Z averaged particle size as measured by a Malvern Zetasizer™.

The milling beads were then removed from the milled mixture to give the Yellow Mill-base.

Cyan Mill-Base

The Cyan Mill-base was prepared in the same way as the Black Mill-base except that a cyan pigment (150 parts of a C.I. Pigment Blue 15:3) and dispersant solution (225 parts) were used. For the Cyan Mill-base the milling was continued for several hours until a particle size of approximately 120 nm had been obtained. The particle size was the Z averaged particle size as measured by a Malvern Zetasizer™.

The milling beads were then removed from the milled mixture. This resulted in Cyan Mill-base (1).

Preparation of Encapsulated Pigment

The mill-bases prepared above were adjusted to a solids content of about 10% by weight by the addition of pure water.

The dispersants in each of the mill-bases were then cross-linked using a cross-linking agent, (Denacol™ EX-321 obtained from Nagase ChemteX, with weight per epoxy=140, hereafter abbreviated as EX-321). This cross-linked the carboxylic acid groups in the dispersant and thereby encapsulated the pigment. The cross-linking reaction was controlled by the presence of a small amount of boric acid (obtained from Aldrich). The cross-linking reaction was effected by heating the above described mixture to a temperature of about 65° C. for 5 hours. This prepared a range of different Encapsulated pigments with the references as indicated in column 1 of Table 1.

TABLE 1

| Encapsulated pigment | Mill-base (parts) | Cross-linking agent (parts) | Boric acid parts |
|---|---|---|---|
| EPS 1 | Cyan Mill-base 1 (3) | EX321 (6.3) | 2.78 |
| EPS 2 | Magenta Mill-base 1 (3) | EX321 (3.57) | 1.58 |
| EPS 3 | Yellow Mill-base 1 (3) | EX321 (4.9) | 2.16 |
| EPS 4 | Black Mill-base 1 (3) | EX321 (5.04) | 2.23 |

Cross-linking

Purification of the Encapsulated Pigment

The encapsulated pigments prepared above in were each purified by means of ultrafiltration. The encapsulated pigment dispersions were diafiltered with pure water. The ultrafiltration membrane was then used to concentrate the encapsulated dispersion back to a solids content of around 10 to 13% by weight.

Example Inks

Example 1

The present invention will now be illustrated by the following examples in which all parts are by weight unless stated to the contrary.

The self-dispersible pigment used were the Pro-Jet® APD 1000 pigment dispersions which are prepared as described above and which are available from FUJIFILM Imaging Colorants Limited.

Titanium dioxide is GLW75PFSP from Kobo Products.

Surfynol® 440 is an acetylenic surfactant from Air Products.

Rovene® 4111 is a styrene butadiene dispersion from Mallard Creek Polymers.

1,2-Benzisothazolin-3-one was obtained as Proxel® GXL (20% solution) from Lonza.

PEG 20K is polyethylene glycol 20,000.

| Ink Example 1-Black Ink | |
|---|---|
| Component | Formulation At 100% Active (Wt %) |
| Projet APD 1000 Black | 4.00 |
| Glycerol | 3.75 |
| Ethylene glycol | 1.25 |
| 2 Pyrrolidone 95% | 5.00 |
| Surfynol 440 | 0.24 |
| 1,2-Benzisothazolin-3-one | 0.075 |
| Rovene 4111 | 4.00 |
| PEG 20K | 6.45 |
| DI Water | to 100 |
| Properties | |
| pH | 8.85 |
| Viscosity at 32° C. cP | 12.68 |
| Surface Tension D/cm | 35.8 |

| Ink Example 2-Cyan Ink | |
|---|---|
| Component | Formulation At 100% Active (Wt %) |
| Projet APD 1000 Cyan | 4.00 |
| Glycerol | 3.75 |
| Ethylene glycol | 1.25 |
| 2 Pyrrolidone 95% | 5.00 |
| Surfynol 440 | 0.25 |
| 1,2-Benzisothazolin-3-one | 0.075 |
| Rovene 4111 | 4.00 |
| PEG 20K | 6.60 |
| DI Water | to 100 |
| Properties | |
| pH | 8.74 |
| Viscosity at 32° C. cP | 12.35 |
| Surface Tension D/cm | 34.89 |

| Ink Example 3-Magenta Ink | |
|---|---|
| Component | Formulation At 100% Active (Wt %) |
| Projet APD 1000 Magenta | 5.00 |
| Glycerol | 3.75 |
| Ethylene glycol | 1.25 |
| 2 Pyrrolidone 95% | 5.00 |
| Surfynol 440 | 0.25 |
| 1,2-Benzisothazolin-3-one | 0.075 |
| Rovene 4111 | 4.00 |
| PEG 20K | 6.55 |
| DI Water | to 100 |
| Properties | |
| pH | 8.73 |
| Viscosity at 32° C. cP | 12.20 |
| Surface Tension D/cm | 35.40 |

| Ink Example 4-Yellow Ink | |
|---|---|
| Component | Formulation At 100% Active (Wt %) |
| Projet APD 1000 Magenta | 4.00 |
| Glycerol | 3.75 |
| Ethylene glycol | 1.25 |
| 2 Pyrrolidone 95% | 5.00 |
| Surfynol 440 | 0.24 |
| 1,2-Benzisothazolin-3-one | 0.075 |
| Rovene 4111 | 4.00 |
| PEG 20K | 6.50 |
| DI Water | to 100 |
| Properties | |
| pH | 8.73 |
| Viscosity at 32° C. cP | 12.10 |
| Surface Tension D/cm | 34.89 |

| Ink Example 5-Red Ink 1 | |
|---|---|
| Component | Formulation At 100% Active (Wt %) |
| Projet APD 1000 Magenta | 3.35 |
| Projet ADP 1000 Yellow | 0.65 |
| Glycerol | 3.75 |
| Ethylene glycol | 1.25 |
| 2 Pyrrolidone 95% | 5.00 |
| Surfynol 440 | 0.24 |
| 1,2-Benzisothazolin-3-one | 0.075 |
| Rovene 4111 | 4.00 |
| PEG 20K | 6.85 |
| DI Water | to 100 |
| Properties | |
| pH | 8.84 |
| Viscosity at 32° C. cP | 12.68 |
| Surface Tension D/cm | 34.48 |

| Ink Example 6-Red Ink 2 | |
|---|---|
| Component | Formulation At 100% Active (Wt %) |
| Projet APD 1000 Red | 4.00 |
| Glycerol | 3.75 |
| Ethylene glycol | 1.25 |
| 2 Pyrrolidone 95% | 5.00 |
| Surfynol 440 | 0.24 |
| 1,2-Benzisothazolin-3-one | 0.015 |
| Rovene 4111 | 4.00 |
| PEG 20K | 6.5 |
| DI Water | to 100 |
| Properties | |
| pH | 8.72 |
| Viscosity at 32° C. cP | 12.47 |
| Surface Tension D/cm | 35.56 |

The inks were printed through a StarFire® $SG_{1024}$ re-circulating print head from FUJIFILM Dimatix. The StarFire® SG1024 re-circulating print head is commonly only used with non-aqueous inks due to a tendency of its face plate to "wet" when used with aqueous inks, thus adversely effecting printer performance.

However the example ink printed without any problems. The print head was photographed with a JetXpert drop watcher. There was no evidence of any face plate wetting with any of the inks of the present invention.

The sustainability of the inks when printed through the StarFire SG1024 print head was evaluated by printing an image with a nozzle check pattern combined with a solid block. The solid block of color measured 30 mm in length, this value is later used in calculating the longer term feathering/latency effect. The nozzle test pattern is used to quantify nozzles which drop out over the course of the test.

After 15 minutes no significant degradation was observed and no missing nozzles were observed.

The latency of the inks in the StarFire SG1024 print head was evaluated by printing an image file that consists of a series of lines and block. Each block is timed to print 1 second from the previous block, the last block representing 6 seconds. For each block, the top portion should be clearly printed as it represent a baseline if there are latency problems the lower section will have a feathered appearance.

After 6 seconds no latency problems were seen with either ink.

PVA Dissolution Test

The printed PVA substrate was dissolved in water with continuous stirring. The solution was dissolved and filtered using a 0.3 micron filter paper. The particles on the filter paper were assessed by examination under a microscope and particle size measurements were carried out on the dispersed particles.

Image Quality

PVA films typically have a matt and glossy side. The red Example Ink 1 and black Example Ink 2 were printed onto the glossy and matt sides of M8630 PVA from Monosol. The print quality was then evaluated and there was no discernible difference between the L*a*b* parameters of the prints on the matt and glossy sides.

| Ink Example 7-White Ink | |
|---|---|
| Component | Formulation At 100% Active (Wt %) |
| Titanium dioxide | 12.00 |
| Glycerol | 3.75 |
| Ethylene glycol | 1.25 |
| 2 Pyrrolidone 95% | 5.00 |
| Surfynol 440 | 0.30 |
| 1,2-Benzisothazolin-3-one | 0.075 |
| Rovene 4111 | 4.00 |
| PEG 20K | 6.30 |
| DI Water | to 100 |
| Properties | |
| pH | 8.71 |
| Viscosity at 32° C. cP | 12.5 |
| Surface Tension D/cm | 35.62 |

Overprint Varnish Composition

An aqueous solution of polyvinyl alcohol was used from Sekisui as a base material for overprint varnish formulation.

| Component | Formulation At 100% Active (Wt %) |
|---|---|
| Polyvinyl Alcohol | 20 |
| Methyl Alchohol | 0.8 |
| DI Water | to 100 |

Inline Printing and Drying

Schematics of printer dryer integration with web is shown in FIG. 1.

A PVA film was printed with the black ink, red ink 1 and the white ink, as described above, using a printer dryer integration system as shown in the schematic. Duplicate samples were printed. One set of samples were coated with an overprint water soluble varnish and dried while the second set were printed and dried but not given an overprint varnish. Drying was for 2 seconds at a web speed of 100-150 meters/minute by a hybrid IR air system with the IR power set at 50% and the airflow at 2 to 8 m/s.

The prints so formed were evaluated in a blocking test and wet swab test

Blocking Test

The ink blocking test evaluates the adhesive properties to the PVA and drying behaviour. The purpose of this test is to ensure that the printed ink is sufficiently dry when it goes through a contact roller. The roller should have no/little ink transfer from printed PVA to the roller. A significant ink transfer can cause image smearing leading to poor image quality.

For test purposes, a 100 g weight was used to simulate the pressure of the printed web against the contact roller. The steps involved in the test were;

1. Transfer a 2×2 inch square sample of printed PVA film on to a hot plate (preset at 65° C.) immediately after drying.
2. Place a 2×2 inch square piece of paper (white paper for the black and red ink and a dark colored paper for white ink) onto the printed film.
3. Place a 100 g weight on the paper and leave for 60 seconds.
4. Remove the weight and record the ink transfer score from the printed PVA film to the paper using a subjective scale of 1 to 5 wherein a higher score indicates less ink transfer with 5 indicating no ink transfer.

Wet Swab Test

The purpose of wet swab test is to ensure the robustness of printed ink adhesion to PVA in the presence of a detergent media.

The steps involved in the test were:

1. Cut test coupons of printed film after drying the ink.
2. Soak a laboratory swab in a detergent solution to ensure wetting of the swab, remove excess detergent from swab.
3. Apply 2 to 3 strokes of wet swab across the printed film.
4. Check for ink transfer on to swab and image smearing. Record an image deformation score using a subjective scale of 1 to 5 wherein a higher score indicates less smearing or image deformation with 5 indicating no smearing or image deformation.

The results are shown below

| Print | Blocking Test | Wet Swab Test |
|---|---|---|
| Red overprint | 5 | 5 |
| Red no overprint | 3 | 4 |
| White overprint | 5 | 5 |
| White no overprint | 4 | 3.5 |
| Black overprint | 5 | 5 |
| Black no overprint | 4 | 4 |

Ink-Set Example

An ink set was prepared using the inks shown in Table 1. The inks of the ink-set were printed onto various PVA films sourced from Monosol and Aicello using an ink-jet printer with a StarFire SG1024 print head. All prints were of an acceptable quality.

TABLE 1

| Ink Set Example | | | | | | | |
|---|---|---|---|---|---|---|---|
| Component | Black Ink | Cyan Ink | Magenta Ink | Yellow Ink | Red Ink 1 | Red Ink 2 | White Ink |
| PEG 20K | 6.45 | 6.50 | 6.50 | 6.50 | 6.85 | 6.50 | 6.30 |
| 2-Pyrrolidone | 5.00 | 5.00 | 5.00 | 5.00 | 5.00 | 5.00 | 5.00 |
| Ethylene Glycol | 1.25 | 1.25 | 1.25 | 1.25 | 1.25 | 1.25 | 1.25 |

TABLE 1-continued

Ink Set Example

| Component | Black Ink | Cyan Ink | Magenta Ink | Yellow Ink | Red Ink 1 | Red Ink 2 | White Ink |
|---|---|---|---|---|---|---|---|
| Glycerol | 3.75 | 3.75 | 3.75 | 3.75 | 3.75 | 3.75 | 3.75 |
| Surfynol 440 | 0.24 | 0.25 | 0.25 | 0.24 | 0.24 | 0.24 | — |
| Surfynol 465 | — | — | — | — | — | — | 0.30 |
| Proxel GXL | 0.075 | 0.075 | 0.075 | 0.075 | 0.075 | 0.075 | 0.075 |
| Pigment Dispersion I | 4.00 | 4.00 | 5.00 | 4.00 | 3.35 | 4.00 | 12.00 |
| Pigment Dispersion II | — | — | — | — | 0.65 | — | — |
| Rovene 4111 (Tg = 69° C.) | 4.00 | 4.00 | 4.00 | 4.00 | 4.00 | 4.00 | 4.00 |
| DI Water | to 100% | to 100% | to 100% | to 100% | to 100% | to 100% | to 100% |

TABLE 2

Ink set ink properties

| Component | Black Ink | Cyan Ink | Magenta Ink | Yellow Ink | Red Ink 1 | Red Ink 2 | White Ink |
|---|---|---|---|---|---|---|---|
| Foam | No | No | No | No | No | No | No |
| pH | 8.85 | 8.74 | 8.73 | 8.73 | 8.84 | 8.72 | 8.71 |
| Surface Tension (Dyne/cm) | 35.80 | 34.89 | 35.40 | 34.89 | 34.48 | 35.56 | 35.62 |
| Viscosity (cPs) @ 32 C 11.0-13.0 | 12.68 | 12.35 | 12.20 | 12.10 | 12.68 | 12.47 | 12.5 |

The invention claimed is:

1. A method for printing on a water-soluble material which comprises the following steps:
   A) ink jet printing, using a printer with a single-pass print-head, an ink onto a water-soluble material so as to form an image wherein the ink comprises a self-dispersible pigment which comprises a carboxy-functional dispersant crosslinked around a pigment core by a cross-linking agent having at least two groups selected from oxetane, carbodiimide, hydrazide, oxazoline, aziridine, isocyanate, N-methylol, keteneimine, isocyanurate and epoxy groups;
   B) overprinting the image formed in step A) with a water soluble overprint varnish.

2. The method for printing on a water-soluble material according to claim 1 wherein the carboxy-functional dispersant comprises benzyl methacrylate.

3. The method for printing on a water-soluble material as claimed in claim 1 wherein the carboxy-functional dispersant is a copolymer comprising:
   (i) from 75 to 97 parts of one or more hydrophobic ethylenically unsaturated monomers comprising at least 50 parts of benzyl methacrylate;
   (ii) from 3 to 25 parts of one or more hydrophilic ethylenically unsaturated monomers having one or more carboxy groups; and
   (iii) 0 to 1 part of hydrophilic ethylenically unsaturated monomers having one or more hydrophilic non-ionic groups;
   wherein the parts are by weight.

4. The method for printing on a water-soluble material as claimed in claim 1 wherein the cross-linking agent has at least two epoxy groups.

5. The method for printing on a water-soluble material as claimed in claim 1 wherein the water-soluble material is a polyvinyl alcohol film.

6. The method for printing on a water-soluble material as claimed in claim 1 wherein in step B) overprinting the image formed in step A) with a water soluble overprint varnish is by flexographic printing.

7. The method for printing on a water-soluble material as claimed in claim 1 wherein in step B) the water-soluble overprint varnish comprises at least one water soluble polymer.

8. The method for printing on a water-soluble material as claimed in claim 7 wherein in step B) the water soluble polymer comprises polyvinyl alcohol.

9. The method for printing on a water-soluble material as claimed in claim 1 which further comprises one or more drying steps.

10. The method for printing on a water-soluble material as claimed in claim 1 comprises the following steps:
    i) ink jet printing an ink onto a water-soluble material comprising polyvinyl alcohol so as to form an image wherein the ink comprises a self-dispersible pigment which comprises a carboxy-functional dispersant cross-linked around a pigment core by a cross-linking agent having at least two groups selected from oxetane, carbodiimide, hydrazide, oxazoline, aziridine, isocyanate, N-methylol, keteneimine, isocyanurate and epoxy groups;
    ii) drying the image formed in step i);
    iii) overprinting the image formed in step ii) with a water soluble overprint varnish comprising polyvinyl alcohol; and
    iv) drying the varnished image from step iii).

11. The method for printing on a water-soluble material as claimed in claim 1 wherein step (A) comprises ink-jet printing an ink-set comprising a black ink, a cyan ink, a yellow ink and a magenta ink onto a water soluble material.

12. The method for printing on a water-soluble material as claimed in claim 1 step (A) comprises ink-jet printing an ink-set comprising black ink, red ink, and a white ink wherein the self-dispersing pigments in the black and red inks comprise a carboxy-functional dispersant crosslinked around a pigment core by a cross-linking agent having at least two groups selected from carbodiimide, hydrazide, oxazoline, aziridine, isocyanate, N-methylol, keteneimine, isocyanurate and epoxy groups and the white ink comprises titanium dioxide.

13. The method for printing on a water-soluble material as claimed in claim 12 wherein the white ink comprises:
   (a) from 1 to 25 parts of titanium dioxide pigment;
   (b) from 0 to 8 parts of a styrene butadiene latex binder or styrene acrylic binder;
   (c) from 0 to 8 parts of a polyurethane latex binder;
   (d) from 0 to 5 parts of a glycol selected from the group consisting of ethylene glycol, diethylene glycol, propylene glycol, dipropylene glycol or triethylene glycol;
   (e) from 1 to 10 parts of 2-pyrrolidone;
   (f) from 1 to 10 parts of glycerol;
   (g) from 0.01 to 2 parts of an acetylenic surfactant;
   (h) from 0.001 to 5 parts of biocide;
   (i) from 0 to 10 parts of polyethylene glycol or polyvinyl alcohol; and
   (j) the balance to 100 parts water; provided that (b) plus (c) is greater than 0.

\* \* \* \* \*